Oct. 18, 1966  S. A. SEKULICH  3,279,803
FACE LINED SEALS
Filed Nov. 30, 1962  2 Sheets-Sheet 1
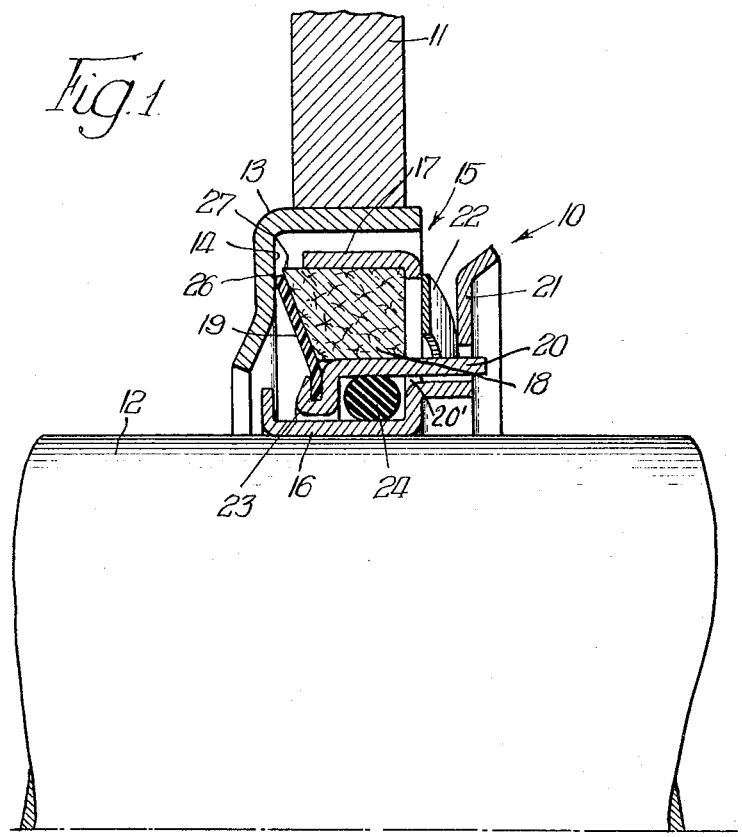
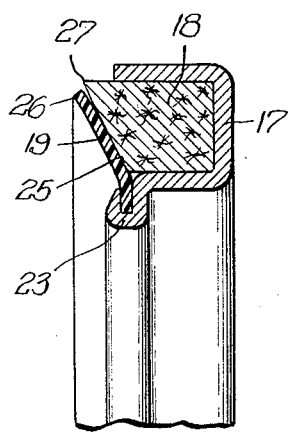
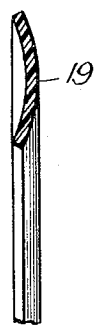
INVENTOR.
Stephen A. Sekulich,
BY
Cromwell, Greist & Warden
Attys Oct. 18, 1966  S. A. SEKULICH  3,279,803
FACE LINED SEALS
Filed Nov. 30, 1962  2 Sheets-Sheet 2
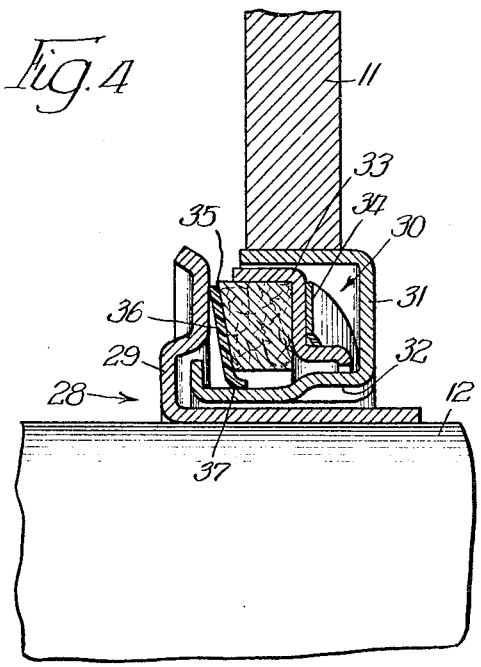
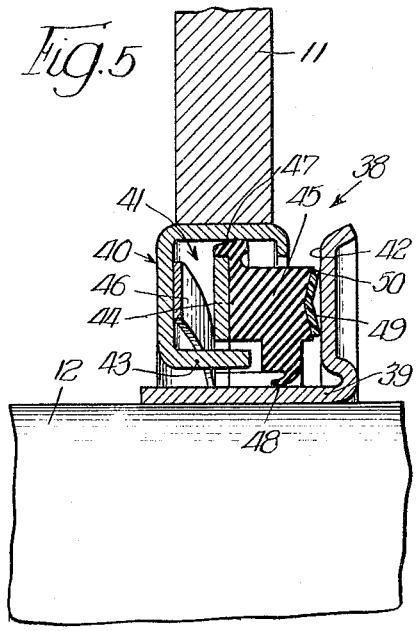
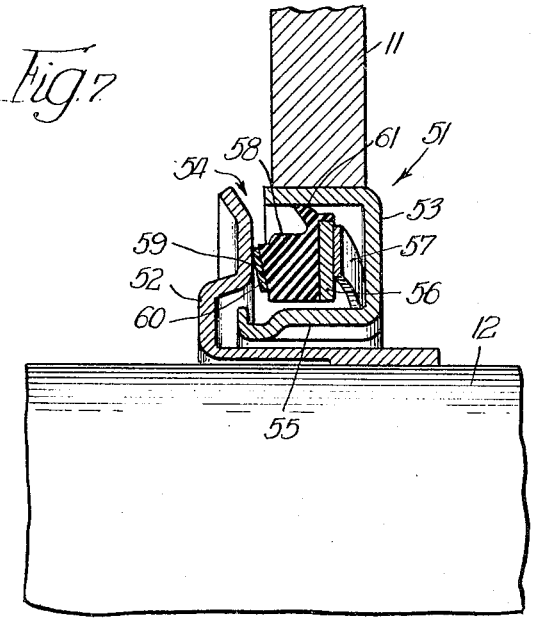
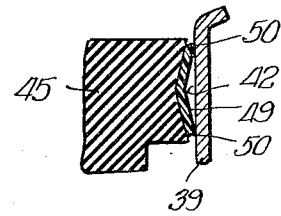
INVENTOR.
Stephen A. Sekulich,
BY
Cromwell, Greist & Warden
Attys

United States Patent Office 3,279,803
Patented Oct. 18, 1966

3,279,803
FACE LINED SEALS
Stephen A. Sekulich, Clarkston, Mich., assignor to Chicago Rawhide Mfg. Co., Chicago, Ill., a corporation of Illinois
Filed Nov. 30, 1962, Ser. No. 241,357
8 Claims. (Cl. 277—85)

The invention is directed to new and improved shaft seals, particularly the end face type, which include special sealing members having sealing face linings of unique design and arrangement providing for improved sealing action.

While the present invention may involve the use of other sealing face lining materials, it has particular application with regard to the use of linings formed from the fluorocarbon resins, such as polytetrafluoroethylene which is commonly known as Teflon. These materials in sintered form exhibit excellent properties for use as sealing members. Such properties include inertness to normally corrosive fluids, resistance to high temperature operation, and self-lubrication. However, this resinous material is difficult to form into the common shapes of sealing members, is difficult to bond and mount, and is somewhat expensive. Furthermore, the material is not normally adequately elastic and is ofter subject to deformation or "flow" in response to operational forces applied thereto.

It is an object of the present invention to provide new and improved seals including as part thereof a special sealing member having a specially arranged and designed sealing face portion which provides the main sealing function.

A further object is to provide a new and improved seal including as a part thereof a unique sealing member comprising a resilient body portion which backs up a specially configurated sealing face portion which is in the form of a specially arranged lining.

Still a further object is to provide a new and improved end face seal having as a part thereof the unique sealing member of the foregoing objects, this sealing member establishing and maintaining a resiliently applied line sealing contact with a surface under seal during relative rotation therebetween, the sealing member alternatively being readily adapted to provide secondary sealing action to establish and maintain a static or dynamic seal in the end face seal structure.

An additional object taken in conjunction with the foregoing objects is to provide a new and improved seal utilizing fluorocarbon resinous material in a new and improved manner to define a sealing surface portion.

Other objects not specifically set forth will become apparent from the following detailed description of the invention made in conjunction with the accompanying drawings wherein:

FIG. 1 is a fragmentary half-section view of an installation including one form of end face seal incorporating the improvements of the present invention;

FIG. 2 is a half-section view of the sealing member of the seal in FIG. 1;

FIG. 3 is a half-section view of the sealing face lining portion of the seal of FIG 1;

FIG. 4 is a fragmentary half-section installational view of a modified form of end face seal;

FIG. 5 is a fragmentary half-section installational view of still another modified form of end face seal;

FIG. 6 is an enlarged fragmentary section of the end face portion of the seal of FIG. 5; and FIG. 7 is a fragmentary half-section installational view of still another modified form of end face seal forming a part of the invention.

In general terms, the invention involves the use of a disc-like lining of relatively hard but flexible material backed up by a body portion formed from resilient material to define a primary sealing member especially adapted for use in an end face seal. The disc-like lining is suitably applied over a face portion of the backing member and at least a part thereof is circumferentially inclined in an axial direction away from the backing member while still backed up thereby to present a projecting edge area for substantially line sealing contact with a surface to be sealed. This particular design of sealing member has special application with the use of fluorocarbon materials such as Teflon. A lining of this type may be readily formed from such materials thus basically avoiding the special problems arising from using the materials to form known types and shapes of complete sealing members.

FIGS. 1—3 illustrate one form of seal 10 incorporating the principles of the present invention. This seal is operatively mounted between a housing part 11 and a shaft 12. A stamping 13 is fixed to the housing part 11 and includes a radially directed sealing surface 14 against which a sealing unit 15 is operative in end face sealing engagement. The sealing unit 15 includes a stamping 16 fixed to the shaft 12 and axially suitably receiving therein a generally U-shaped stamping 17 which clamps a sealing member comprising a body portion 18 and a sealing face lining portion 19. The stamping 17 along the rear radial wall portion thereof is formed with rearwardly projecting locking fingers 20 formed from the material thereof and extending through apertures 20' formed in a rear radial flange portion 21 of the stamping 16. This arrangement locks the stamping 17 from rotation relative to the stamping 16 while permitting axial movement therebetween. A wave spring 22 is confined between the rear radial wall portion of the stamping 17 and the radial wall portion 21 of the stamping 16 and is in engagement with the stamping 17 to urge the same including the sealing member therein into end face sealing engagement with the stamping 13.

The block-like body portion 18 of the sealing member is formed from resilient material, preferably soft rubber or cork, and the front face thereof is covered by the lining portion 19, this portion being formed from relatively hard but flexible sealing material, preferably a fluorocarbon material such as Teflon. The body portion 18 is either clamped in the stamping 17 or is suitably bonded thereto and the inner circumferential edge portion of the lining portion 19 is attached to the stamping 17 along a crimp-like clamping area 23. The outer edge portion of the lining 19 is in running sealing engagement with the radial sealing surface 14 of the stamping 13 to establish the primary seal. An O-ring 24 establishes a secondary or static seal between the stampings 16 and 17 below the sealing member.

FIGS. 2 and 4 illustrate in detail the forming of the sealing member. The Teflon lining portion 19 shown in FIG. 3 prior to operative mounting is a relatively thin disc which may be readily sliced from a billet or preform of Teflon. The procedure followed in forming such a billet is well known in the art and generally involves the compacting of powdered Teflon to billet shape followed by sintering of the compacted powder under elevated temperature conditions to transform the material into relatively hard rod or tube-like shape. This material can then be sliced to any desired thickness and can be cut by stamping or the like if necessary to obtain the final shape. As shown particularly in FIG. 3, the washer-like lining portion 19 as sliced from a billet is not normally flat but tends to curve or bow through the radial section thereof. This is illustrative of one of the disadvantages of providing Teflon with special sealing member shapes as somewhat complex shapes are difficult if not impossible to obtain in a controlled and consistently reproducible manner.

The particular form of sealing member of the present invention permits efficient utilization of Teflon parts of this type without any disadvantages arising from problems of shape control. FIG. 2 illustrates the lining portion 19 clinched along its inner peripheral margin by the stamping 17 and overlying an inclined outer surface 25 of resilient body portion 18. The lining portion 19 should be applied so that any curved section thereof presents a concave outer surface.

An important aspect of the invention resides in the utilization of the lining portion 19 so that the same is circumferentially inclined in an axial direction away from the backing material thus presenting a projecting, circumferentially continuous edge area 26 which is capable of establishing substantially line sealing contact with the surface to be sealed . A line contact of this type is the more efficient form of sealing contact. This is particularly important with the use of Teflon as such material is not highly resilient. The particular arrangement described using a thin section of Teflon aids in overcoming the disadvantages of the lack of sufficient resiliency in this material while additionally providing for the most efficient type of sealing action involving line contact. In this respect the lining portion 19 more readily follows and seals with the wear surface 14 of the stamping 13 and accommodates or conforms to any unevenness or distortion therein.

The resilient body portion 18 cushions and backs up the lining portion 19 to aid the same to conform to any irregularities in the surface under seal and further to absorb any operational shock which might otherwise be effective to disrupt the sealing action. The feature of inclination of the lining portion 19 assures the concentration of the pressure of the spring 22 on the outer peripheral portion of the lining portion 19 to maintain an efficient sealing action.

As best shown in FIG. 2, the resilient backing material of the body portion 18 along the outer periphery 27 thereof overextends or overlaps the lining portion. This radially projecting area for purposes of illustration and explanation is somewhat exaggerated. However, it is preferred that the body portion 18 at least slightly overlap the lining portion 19 about the outer periphery 27 thereof to accommodate any radial elongation or "creep" occurring in the lining material. This material is subjected to the effects of centrifugal force in the event that the sealing unit 15 rotates. If the stamping 13 rotates, the sealing pressure may be effective to at least somewhat radially elongate the sealing edge area 26 of the lining portion 19. Thus by providing an overlapping area 27 in the body portion 18, the sealing area is at all times resiliently backed up by the body portion during prolonged operational use of the seal. In the absence of such an arrangement, the creation of any substantial elongation results in the highly important sealing contact area 26 of the lining portion projecting radially outwardly beyond the outer periphery of the body portion 18 and reversing itself rearwardly thereover thus destroying the preferred efficient line sealing contact.

FIG. 4 illustrates a modfied form of end face seal 28 including a wear stamping 29 fixed to the shaft 12 and telescopically receiving thereabout a sealing member 30 axially slidably received in a stamping 31 which is fixed to the housing 11. The inner axial wall portion of the stamping 31 includes a plurality of circumferentially spaced detent-like enlargements 32 which are received in slot-like areas formed in a generally Z-shaped stamping 33 forming a part of the sealing member 30. This interlocking arrangement prevents relative rotation between the sealing member 30 and the stamping 31 while permitting relative axial movement therebetween. A wave spring 34 acts between the stampings 31 and 33 to hold the sealing member 30 in running end face sealing engagement with the wear stamping 29.

The sealing member is carried by the stamping 33 and includes a resilient body portion 35 of the same material as the body portion 18 previously described and formed with an outer inclined end face to which is secured a disc-like lining portion 36. This lining portion is suitably bonded to the outer inclined face of the body portion 35 and, by reason of the inclination of this face, the outer peripheral area of the lining portion 36 establishes a substantially line sealing contact with the stamping 29. Thus all of the advantages described above in connection with the seal 10 are realized in the design of FIG. 4. Furthermore, with this type of design it is possible to provide for the lining portion 36 defining an inner peripheral secondary sealing lip 37 which is flexed into sealing engagement with the outer surface of the axial leg portion of the stamping 32. This secondary sealing lip functions primarily to prevent the entry of foreign material such as dirt or the like into the seal which could interfere with efficient axial movement of the sealing unit 30 to accommodate operational variations between the housing and shaft.

FIG. 5 illustrates another modified form of seal 38 of end face type including a wear stamping 39 fixed to the shaft 12, a stamping 40 fixed to the housing 11 and telescopically receiving therein a sealing member 41. The stamping 39 provides a radially directed sealing surface 42 and the stamping 40 provides a plurality of axially inwardly directed locking lugs 43. The sealing member 41 includes a rigid washer 44 having bonded to a face thereof a resilient body portion 45. The washer 44 includes suitable recesses or apertures receiving the locking lugs 43 therein to prevent relative rotation between the sealing member 41 and the stamping 40. Axial movement is permitted with this arrangement and a wave spring 46 is operative between the stamping 40 and the washer 44.

The body 45 is illustrated as being formed from rubber material and is shaped in a mold to include an outer diameter secondary static sealing lip 47 and an inner diameter secondary running sealing lip 48. The lip 47 is in sealing engagement with an inner surface portion of the stamping 40 and the lip 48 is in sealing engagement with an inner surface portion of the stamping 39.

As best shown in FIG. 6, the front face of the body portion 45 is of generally V-shape and has bonded thereto a generally V-shaped lining portion 49 which presents a pair of outwardly diverging flat areas defining line contact sealing edges 50 each in running sealing engagement with the sealing surface 42 of the stamping 39 in radially spaced relation. This particular form of sealing member is especially adapted for use where two liquids are to be sealed from one another, or where a special dirt condition exists. The lining portion 49 may be readily shaped and bonded to the body portion 45 during the molding of the body portion.

FIG. 7 illustrates another form of end face seal 51 including a wear stamping 52 fixed to the shaft 12 and receiving thereabout a stamping 53 fixed to the housing 11 and telescopically receiving therein an axially movable sealing member 54. The inner axial wall portion of the stamping 53 includes enlargements defining detents 55 which are received in suitable grooves or slots formed in the inner diameter of a washer 56 forming a part of the sealing member 54. A wave spring 57 is confined between the stamping 53 and the washer 56 to maintain the sealing unit in running sealing engagement with the stamping 52. A resilient body portion 58 is bonded to the washer 56 and includes a front face projecting nose portion 59 defining an outer surface inclination of the type earlier described and to which a lining portion 60 is suitably secured. The body portion 58 further includes an outer diameter secondary sealing lip 61 integrally formed therewith an operatively backed up by the washer 56. The secondary sealing lip 61 is in static sealing engagement with an outer axial leg portion of the stamping 53. The entire sealing member 54 may be suitably fabricated in a mold during the shaping and curing of the body portion 58 formed from rubber.

With regard to the modified designs of FIGS. 4–7, the peripheral edge portion of the lining portions are fully backed up by the resilient body portions with the latter overextending the edge portions for the reasons described in conjunction with the seal of FIGS. 1–3. The various sealing units described may either rotate relative to a sealing surface or may be stationary relative thereto. The housing or the shaft itself may provide the sealing surface as an integral part thereof thus eliminating the various wear stampings described. The design principles of the present invention have utility with different types of materials from which the lining portions can be formed, but for the reasons specified have particular utility with the use of Teflon.

Obviously certain modifications and variations of the invention as hereinbefore set forth may be made without departing from the spirit and scope thereof, and therefore only such limitations should be imposed as are indicated in the appended claims.

I claim:

1. An annular seal for mounting between a pair of parts at least one of which rotates relative to the other, said seal comprising a sealing member including a body portion and sealing face portion for running sealing contact with one of said parts, said body portion being formed from resilient material, said sealing face portion being formed from a disc-like lining of relatively hard but flexible sealing material overlying a face of said body portion and resiliently backed up thereby means mounting said sealing face portion against substantial radial and axial movement relative to said body portion, said sealing face portion being circumferentially inclined in an axial direction away from said body portion and presenting a projecting circumferentially continuous edge area for sustantially line sealing contact with said one part to minimize heat and friction, said face of said body portion at least substantially fully overlying and backing up said sealing face portiton with said body portion at least slightly coextensively overextending said continuous edge area thereof beyond said edge area, and means for mounting said sealing member on the other of said parts.

2. The seal of claim 1 wherein said sealing face portion is formed from a fluorocarbon material.

3. An end face seal for mounting between a pair of members at least one of which rotates relative to the other, said seal comprising a pair of telescoping and relatively axially movable parts arranged for mounting on one of said members, one of said parts including a sealing member having a body portion and sealing face portion for running sealing contact with a surface carried by the other of said members, said body portion being formed from resilient material, said sealing face portion being formed from a disc-like lining of relatively hard but flexible material overlying a face of said body portion and resiliently backed up thereby, means mounting said sealing face portion against substantial radial and axial movement relative to said body portion, said sealing face portion being circumferentially inclined in an axial direction away from said body portion and presenting a projecting circumferentially continuous edge area for substantially line sealing contact with said surface carried by said other member, said face of said body portion at least substantially fully overlying and backing up said sealing face portion with said face of said body portion at least slightly coextensively overextending said continuous edge thereof beyond said edge area, spring means acting between said parts to urge said sealing face portion into sealing contact with said surface, and means interconnecting said parts to permit relative axial movement therebetween while preventing relative rotation.

4. The end face seal of claim 3 wherein said one part clamps an area of said sealing face portion which is remote from said continuous edge area.

5. The end face seal of claim 3 wherein said sealing face portion is substantially V-shaped to define a pair of spaced areas for multiple line sealing contact with said surface.

6. An end face seal for mounting between a pair of members at least one of which rotates relative to the other, said seal comprising a pair of telescoping and relatively axially movable parts arranged for mounting on one of said members, one of said parts including a primary sealing member having a body portion and sealing face portion for running sealing contact with a surface carried by the other of said members, said body portion being formed from resilient material, said sealing face portion being formed from a disc-like lining of relatively hard but flexible material overlying a face of said body portion and resiliently backed up thereby, means mounting said sealing face portion against substantial radial and axial movement relative to said body portion said sealing face portion being circumferentially inclined in an axial direction away from said body portion and presenting a projecting circumferentially continuous edge area for substantially line sealing contact with said surface carried by said other member to minimize heat and friction, said body portion at least substantially fully overlying and backing up said sealing face portion with said body portion at least slightly overextending said continuous edge thereof beyond said edge area, said face of spring means acting between said parts to urge said sealing face portion into sealing contact with said surface, means interconnecting said parts to premit relative axial movement therebetween while preventing relative rotation, and a secondary sealing member acting between said parts to seal the same relative to one another while permitting relative axial movement therebetween.

7. The end face seal of claim 6 wherein said secondary sealing member is in the form of a lip seal constituting an extension of an area of said sealing face portion which is remote from said continuous edge area.

8. The end face seal of claim 6 wherein said secondary sealing member is in the form of a lip seal formed integrally with said body portion.

References Cited by the Examiner

UNITED STATES PATENTS

| | | | |
|---|---|---|---|
| 2,240,252 | 4/1941 | Bernstein | 277—39 |
| 2,341,900 | 2/1944 | Boden | 277—92 |
| 2,365,046 | 12/1944 | Bottomley | 277—85 |
| 2,373,443 | 4/1945 | Armington | 277—92 |
| 2,509,461 | 5/1950 | Ulseth | 277—39 |
| 2,613,960 | 10/1952 | Nelson | 277—38 |

FOREIGN PATENTS

| | | |
|---|---|---|
| 1,100,410 | 2/1961 | Germany. |
| 755,238 | 8/1956 | Great Britain. |

LAVERNE D. GEIGER, *Primary Exmainer.*

SAMUEL B. ROTHBERG, *Examiner.*

E. DOWNS, J. MEDNICK, *Assistant Examiners.*